United States Patent
Martinelle et al.

(10) Patent No.: US 9,162,198 B2
(45) Date of Patent: Oct. 20, 2015

(54) METHOD AND DEVICE FOR MIXING COMPRESSED AIR AND REDUCING AGENT AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Guillaume Martinelle, Longeville les St Avold (FR); Philippe Mertes, Faulquemont (FR); Georges Maguin, Marly (FR)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/257,160

(22) Filed: Apr. 21, 2014

(65) Prior Publication Data
US 2014/0223892 A1    Aug. 14, 2014

Related U.S. Application Data

(63) Continuation of application No. PCT/EP2012/069376, filed on Oct. 1, 2012.

(30) Foreign Application Priority Data

Oct. 19, 2011 (DE) .......................... 10 2011 116 336

(51) Int. Cl.
*F01N 3/00* (2006.01)
*F01N 3/10* (2006.01)
(Continued)

(52) U.S. Cl.
CPC .............. *B01F 15/0227* (2013.01); *F01N 3/10* (2013.01); *F01N 3/2066* (2013.01); *F01N 2610/02* (2013.01); *F01N 2610/08* (2013.01); *Y02T 10/24* (2013.01)

(58) Field of Classification Search
CPC ..... F01N 3/10; F01N 3/2066; F01N 2610/02; F01N 2610/08; Y02T 10/24; B01F 15/0227
USPC .................................. 60/286, 289, 295, 303
See application file for complete search history.

(56) References Cited

U.S. PATENT DOCUMENTS 3,587,974 A  *  6/1971  Rosenkranz .................. 239/423
5,606,856 A     3/1997  Linder et al.
(Continued)

FOREIGN PATENT DOCUMENTS

DE        4230056 A1     3/1994
DE        4441261 A1     5/1996
(Continued)

*Primary Examiner* — Thomas Denion
*Assistant Examiner* — Diem Tran
(74) *Attorney, Agent, or Firm* — Laurence A. Greenberg; Werner H. Stemer; Ralph E. Locher

(57) ABSTRACT

A device for providing a mixture of compressed air and liquid reducing agent includes a first inflow duct for reducing agent, a second inflow duct for compressed air, an outlet duct for the mixture, a mixing point at which compressed air and reducing agent are merged, and a mixing duct which adjoins the mixing point and which connects the mixing point and the outlet duct. The first inflow duct opens into the mixing point in an axial direction. The second inflow duct is connected to the mixing point through at least one injection duct. The at least one injection duct opens into the mixing point in a tangential direction. A method for mixing liquid reducing agent and compressed air to form a mixture and a motor vehicle having the device, are also provided.

15 Claims, 3 Drawing Sheets

(51) Int. Cl.
   *B01F 15/02*   (2006.01)
   *F01N 3/20*   (2006.01)

(56) References Cited

U.S. PATENT DOCUMENTS

| | | |
|---|---|---|
| 5,943,858 A | 8/1999 | Hofmann et al. |
| 8,371,113 B2 * | 2/2013 | Jochumsen et al. ............ 60/303 |
| 2003/0145580 A1 * | 8/2003 | Ripper et al. .................. 60/286 |
| 2009/0031714 A1 | 2/2009 | Jochumsen et al. |

FOREIGN PATENT DOCUMENTS

| | | |
|---|---|---|
| DE | 19963394 A1 | 7/2001 |
| DE | 102006037123 A1 | 2/2008 |
| EP | 0586913 A2 | 3/1994 |
| EP | 1875051 A1 | 1/2008 |
| WO | 9636797 A1 | 11/1996 |
| WO | 2006108419 A1 | 10/2006 |

* cited by examiner

METHOD AND DEVICE FOR MIXING COMPRESSED AIR AND REDUCING AGENT AND MOTOR VEHICLE HAVING THE DEVICE

CROSS-REFERENCE TO RELATED APPLICATION

This is a continuation, under 35 U.S.C. §120, of copending International Application No. PCT/EP2012/069376, filed Oct. 1, 2012, which designated the United States; this application also claims the priority, under 35 U.S.C. §119, of German Patent Application DE 10 2011 116 336.4, filed Oct. 19, 2011; the prior applications are herewith incorporated by reference in their entirety.

BACKGROUND OF THE INVENTION

Field of the Invention

The present invention relates to a method and a device for mixing compressed air and reducing agent and a motor vehicle having the device.

In particular in the automotive field, for the purification of the exhaust gases of internal combustion engines, exhaust-gas treatment processes are used in which a fluid is added to the exhaust gas which assists in the conversion of pollutants in the exhaust gas. A particularly commonly used exhaust-gas treatment process in which a fluid is supplied is the selective catalytic reduction [SCR] process. In that process, a reducing agent is supplied to the exhaust gas, with the aid of which reducing agent nitrogen oxide compounds in the exhaust gas can be reduced. A particularly commonly used reducing agent is ammonia. Ammonia is normally not directly stored in motor vehicles but rather in the form of a reducing agent precursor solution which can be converted to form ammonia. That takes place thermally in the exhaust gas and/or with the aid of a catalytic reactor, which may be disposed within and/or outside the exhaust gas. An aqueous urea solution, for example, may be used as a reducing agent precursor solution. A 32.5% urea-water solution available under the trademark AdBlue® is particularly commonly used. The expressions "reducing agent" and "reducing agent precursor" will hereinafter be used synonymously for one another.

The reducing agent is normally supplied to an exhaust-gas treatment device by using an injection device. It has been found that it may be advantageous for the reducing agent to not be injected in pure form but rather as a mixture of reducing agent and air. That is advantageous on one hand because particularly high temperatures arise in the region of the exhaust-gas treatment device. Those high temperatures are often transferred to the injection device for the injection of the reducing agent. In that way, a chemical change or partial conversion of the reducing agent into ammonia can already occur in the injection device. The injection of the reducing agent together with compressed air as a carrier medium results in particularly effective flushing and cooling of the injection device. Furthermore, the reducing agent remains in the injection device for a relatively short time. A chemical reaction of the reducing agent in the injection device is prevented in this way.

The injection of the reducing agent together with compressed air furthermore improves the distribution of the reducing agent in the exhaust-gas treatment device. The spray mist generated during the injection is finer as a result of the compressed air.

Furthermore, in the case of an injection of the reducing agent with compressed air, flushing of the injection device with pure compressed air can take place after a stoppage of operation of the exhaust-gas treatment device. In that way, the mixture present in the injection device can be conveyed out of the injection device. Since conventional reducing agents (such as, for example, AdBlue®) freeze at temperatures of −11° C., it is advantageous for the reducing agent or the mixture to be conveyed out of the injection device in the event of a stoppage of operation. As a result of the emptying of the injection device, it is possible to avoid freezing of the reducing agent in the injection device, and resulting damage to the injection device.

A problem for the supply of the reducing agent together with air is often the generation of the mixture. The reducing agent/air mixture should be distributed as homogeneously as possible in the exhaust-gas treatment device. At the same time, it is necessary to prevent depositions of reducing agent in the region of the mixing point or location at which the mixing of reducing agent and air takes place. Depositions may arise, for example, in the form of crystalline urea precipitations out of the reducing agent. Such depositions block the mixing point and change the flow conditions. Furthermore, such depositions can dissolve and cause damage both at the mixing point and also in the injection device.

SUMMARY OF THE INVENTION

It is accordingly an object of the invention to provide a method and a device for mixing compressed air and reducing agent and a motor vehicle having the device, which overcome the hereinafore-mentioned disadvantages and alleviate or solve the highlighted technical problems of the heretofore-known methods, devices and motor vehicles of this general type. It is sought, in particular, to disclose an especially inexpensive and particularly advantageous device for providing a mixture of compressed air and liquid reducing agent. Furthermore, it is sought to describe a particularly advantageous method for generating a mixture of liquid reducing agent and compressed air.

With the foregoing and other objects in view there is provided, in accordance with the invention, a device for providing a mixture of compressed air and liquid reducing agent, comprising a first inflow duct for reducing agent, a second inflow duct for compressed air, an outlet duct for the mixture and a mixing point at which compressed air and reducing agent are merged. A mixing duct adjoins the mixing point and connects the mixing point and the outlet duct. The first inflow duct opens into the mixing point in an axial direction, and the second inflow duct is connected to the mixing point through at least one injection duct. The at least one injection duct opens into the mixing point in a tangential direction. The at least one injection duct opens into the mixing point preferably over a circumferential segment of the mixing point and/or of the mixing duct and/or of the first inflow duct.

Both the first inflow duct and also the second inflow duct may have in each case a valve which serves for dosing the quantity of compressed air and reducing agent. These valves need not be a constituent part of the device according to the invention. The valves may, for example, also be a constituent part of a pump module to which the device according to the invention can be connected. The reducing agent is supplied to the first inflow duct typically at a pressure of 3 to 7 bar. The compressed air is supplied to the second inflow duct typically at a pressure of 3 to 5 bar. In particular, the pressure of the reducing agent may fluctuate intensely during the operation of the device. The average pressure of the reducing agent during operation is generally lower than the average pressure of the compressed air. The average pressure of the reducing agent in the first inflow duct is preferably between 3.0 and 3.5 bar. The average pressure of the compressed air in the second inflow duct is preferably between 3.5 and 4.0 bar.

The mixing point is preferably a region of a flow path for the reducing agent through the device, in which region the compressed air is supplied. The at least one mixing duct is preferably formed directly adjoining the mixing point. The first inflow duct for reducing agent and the mixing duct preferably merge directly into one another, wherein the mixing point forms the transition from the first inflow duct to the mixing duct and the first inflow duct and the mixing duct predefine the flow path for reducing agent. The exact position of the mixing point, or the exact location at which the continuous flow path is referred to no longer as the first inflow duct but rather as the mixing duct, may be defined by the position of the supply of compressed air. The position of the mixing point may therefore be defined by the opening point of the at least one injection duct. Likewise, a widening in the flow path of the first inflow duct and/or of the mixing duct may be defined as a mixing point.

The compressed air is supplied to the mixing point through at least one injection duct. Compressed air is supplied to an injection duct through a second inflow duct for compressed air. In relation to the second inflow duct, the at least one injection duct is preferably narrowed at least in sections. This means that the at least one injection duct or the multiplicity of injection ducts has a total cross-sectional area smaller than the cross-sectional area of the second inflow duct for compressed air. In this way, it can be ensured that the compressed air is accelerated in the region of the at least one injection duct and is therefore supplied, having been accelerated, to the mixing point. Particularly fine atomization of the reducing agent by the compressed air is attained in this way.

The second inflow duct preferably opens firstly into a collecting region, from which the at least one injection duct branches off. The injection duct opens into the mixing point preferably over a circumferential segment. That is to say, in particular, that the at least one injection duct opens into an imaginary circumferential surface of the duct around the mixing point. The flow direction of the reducing agent or the alignment of the first inflow duct and the alignment of the mixing duct define an axial direction in relation to which the tangential direction is defined. From this point of view, the first inflow duct or the mixing duct has, in the region of the mixing point, the shape of a pipe with a circumferential surface and an axis or central line. The axis or central or center line defines the axial direction. The at least one injection duct then opens into a circumferential segment of the circumferential surface of the pipe, of the mixing point, of the mixing duct or of the first inflow duct.

In accordance with another particularly advantageous feature of the device of the invention, the compressed air is supplied to the mixing point in such a way that a compressed-air jacket is formed around the reducing agent in the region of the mixing point. If the compressed air is supplied to the mixing point through the injection ducts over a circumferential segment, the compressed air at the mixing point directly after the injection through the injection ducts is already situated at the outside around the reducing agent, or around a reducing agent flow. The mixing point, the first inflow duct, the mixing duct and/or the injection ducts are now preferably constructed in such a way that that state is at least predominantly maintained. The reducing agent thereby remains preferably in a central region of the mixing point or of the mixing duct. The compressed air forms a compressed-air jacket which surrounds the reducing agent at least partially or in sections. Such a configuration may be attained, for example, by virtue of the compressed air forcing the reducing agent towards a central region of the mixing point, and the mixing point being constructed in such a way that swirl formations between the reducing agent and compressed air are substantially prevented as far as into an outer edge region of the mixing point.

In accordance with a further advantageous feature of the device of the invention, two injection ducts open tangentially into the mixing point in a circumferential segment, wherein a guide structure is disposed between the injection ducts, which guide structure is suitable for deflecting the compressed-air flows which enter into the mixing point through the injection ducts into a radial direction with respect to the reducing agent flow. Through the use of such a configuration, it is possible to cause the compressed air to force the reducing agent into a central region of the mixing point, thus forming a compressed-air jacket around the reducing agent. In this way, a jacket flow is generated which has a central reducing agent flow and, situated around the latter, a compressed-air jacket. In general, the embodiment of the device with two injection ducts is preferable. It is, however, also possible for the device to be provided with a different number of injection ducts, for example one injection duct, three injection ducts or four injection ducts.

In accordance with an added particularly advantageous feature of the device of the invention, the mixing duct is at a first angle of 45° to 85° with respect to the axial direction of the first inflow duct. The first angle is preferably situated directly downstream of the mixing point or still in the region of the mixing point. The reducing agent flow is thus mixed with the compressed-air flow and simultaneously deflected. The deflection takes place preferably counter to the tangential direction in which the at least one injection duct opens into the mixing point. Furthermore, the deflection obtained by the first angle however takes place in a radial direction in which the compressed-air flows are deflected by a guide structure at the mixing point. In this way, the deflection of the reducing agent by the first angle of 45° to 85° can be assisted by the compressed air. The compressed air forces the reducing agent in the direction of the first angle. Contact of the reducing agent with the mixing point or with the mixing duct and/or with the wall of the mixing point or the wall of the mixing duct can thereby be prevented.

In accordance with an additional advantageous feature of the device of the invention, the mixing duct has a profile which is curved away from the outlet duct, and a second angle of 50° to 90° is formed between the outlet duct and the mixing duct.

In accordance with yet another advantageous feature of the device of the invention, the outlet duct is aligned parallel to the first inflow duct.

Accordingly, a further deflection of the reducing agent or of the mixture by a second angle preferably takes place after the first angle. That deflection takes place subsequently to the mixing duct or between the mixing duct and the outlet duct. The mixing duct preferably has a profile which is curved (in relation to the axial direction). The curvature, predefined by the first angle, in the region of the mixing point is preferably continued in similar fashion in the mixing duct. The mixing duct preferably has a curvature of 5° to 10° over its entire length. The second angle is therefore advantageously slightly larger than the first angle. The second angle is preferably between 50° and 90°. The first inflow duct and the mixing duct, viewed together, are preferably in an S-shaped configuration. A particularly compact construction of the device can be obtained in this way.

In accordance with yet a further advantageous feature of the device of the invention, the first inflow duct and the second inflow duct are disposed parallel to one another. The first inflow duct and the second inflow duct preferably have ports disposed directly adjacent one another. The device may thus be mounted in a particularly simple manner on a device for providing compressed air and for providing reducing agent or on a flat or planar mounting plate. Such a device for providing compressed air and reducing agent may, for example, be a pump module which has a contact surface for the device according to the invention.

In accordance with yet an added advantageous feature of the device of the invention, the mixing point and the mixing duct are formed by polymer material. A polymer material means a plastic material or a rubber material, for example. A durable high-performance plastic is preferably used for this purpose. A particularly advantageous plastic in this context is PPS (polyphenylene sulphide) which is available, for example, under the trademark Fortron®.

The plastic preferably has a certain degree of flexibility in the pressure range encountered in the mixing duct. The pressure range lies between 3 and 8 bar. In this way, it can be achieved that the surfaces of the mixing point and of the mixing duct are flexible and slightly movable. If depositions form on those surfaces, they are possibly released as a result of the flexibility or the movement of the material surfaces. Furthermore, reducing agent is chemically highly aggressive. The described plastic has particularly high chemical resistance with respect to reducing agent.

With the objects of the invention in view, there is also provided a method for mixing liquid reducing agent and compressed air to form a mixture, comprising at least the following steps:
 a) generating a reducing agent flow,
 b) generating a compressed-air jacket around the reducing agent flow in such a way that a jacket flow is formed,
 c) introducing the jacket flow into a mixing duct,
 d) mixing the compressed-air jacket and the reducing agent flow in the mixing duct in such a way that a mixture flow is formed, and
 e) providing the mixture flow at an outlet duct.

The advantages and special structural features explained with regard to the device according to the invention can be applied and transferred to the method according to the invention. The same applies to the refinements and advantages highlighted below with regard to the method according to the invention. These can be transferred to the device according to the invention.

Steps a) to e) are carried out preferably in the stated sequence along the flow direction of the reducing agent.

In step a), the reducing agent flow is generated, for example, by virtue of liquid reducing agent being provided through a first inflow duct. In step b), a compressed-air jacket can then be generated around the reducing agent flow by virtue of the compressed air being supplied in a tangential direction over a circumferential segment at a mixing point. The compressed air is then situated substantially around the reducing agent. A particularly well-defined jacket flow is thereby formed.

During the introduction of the jacket flow into the mixing duct during step c), it is preferable for the compressed-air jacket to substantially not be penetrated, in such a way that the reducing agent does not pass to an excessive extent into the outer region of the jacket flow. It is thereby possible for depositions of the reducing agent in the device in which the method according to the invention takes place to be effectively reduced or even prevented.

The mixing of the compressed-air jacket and reducing agent flow in step d) takes place preferably not turbulently but rather laminarly, or by diffusion, at least over a portion of the common flow path. It is thus possible to prevent reducing agent from passing in an uncontrolled manner into the outer region of the jacket flow.

The mixing duct is preferably constructed so as to have an approximately circular cross-sectional shape directly downstream of the mixing point where step b) takes place. This makes it particularly easy for the jacket flow with the compressed-air jacket to be generated and maintained. The cross section of the jacket flow is preferably flattened in the direction of an outlet duct where a mixture jet is provided. A corresponding situation is achieved, for example, by a construction of a mixing duct in which the mixing duct is of circular construction on the side of the mixing point and merges continuously into a flattened shape on the side of the outlet duct.

Although the flattening of the mixing duct makes it difficult to maintain the compressed-air jacket around the reducing agent flow, it does however promote mixing-through of reducing agent and compressed air. The flattening of the cross section of the mixing duct, in particular, shortens diffusion paths for the compressed air into the reducing agent. The increased risk of reducing agent passing through the compressed-air jacket in the flattened region is reduced in the vicinity of the outlet duct in that substantial mixing-through of compressed air and reducing agent has already taken place. Concentrated reducing agent is no longer present there, rather only reducing agent which has already been partially mixed through with compressed air. Concentrated reducing agent can therefore no longer pass through the compressed-air jacket in that region.

The provision of the mixture flow in step e) takes place preferably through a port to which a line for conducting the mixture to an injection device can be connected. The injection device is constructed preferably to supply the mixture to an exhaust-gas treatment device.

By forming a compressed-air jacket around the reducing agent flow the erosive impact is reduced which the reducing agent otherwise might have on the device and, in particular, on the mixing point and/or the mixing duct. The direction of flow of the reducing agent flow is aligned at least partially parallel to the wall of the mixing point and/or the mixing duct by the compressed-air jacket. There might exist crystalline excretions in the reducing agent flow, which include (solid) urea and/or ammonia precursors, for example. If these (solid) excretions strike against the wall of the mixing point and/or the mixing duct with high velocity and with correspondingly high kinetic energy, erosion of the wall occurs. Due to the at least partially parallel alignment of the flow along the wall, striking of excretions with high kinetic energy against the wall can be reduced or even prevented effectively, especially because the component of the velocity of the excretions perpendicular to the wall is being reduced significantly.

The compressed-air jacket also reduces the chemical effect of the reducing agent on the device and, in particular, on the mixing point and/or the mixing duct. The compressed-air jacket insulates the wall of the mixing point and/or of the mixing duct at least partially from the reducing agent flow. Additionally, the reducing agent flow can then not act chemically on the wall.

Due to the ratio of the amount of compressed air in the compressed air flow to the amount of reducing agent in the reducing agent flow a maximum concentration of reducing agent in the mixture flow can be adjusted. This maximum concentration can be adjusted in such a manner that the forming of crystalline excretions in the mixture flow is avoided extensively.

Through the use of the pressure air flow, the reducing agent, respectively the reducing agent flow is carried out of the mixing point and/or of the mixing duct. When providing the mixture ends it is, in particular, possible to deactivate at first the reducing agent flow and adjacently (time-delayed) the pressure air flow. This procedure can cause the pressure air flow to carry out the reducing agent flow from the device, in particular the mixing point and the mixing duct, completely.

In accordance with another advantageous mode of the method of the invention, the jacket jet is deflected, before step c), by an angle of 45° to 85°. It has been found that the jacket flow is made particularly stable, in particular, by using a deflection directly after being generated, and turbulence in the jacket flow can be particularly effectively eliminated.

The method is furthermore advantageous if, in step d), the compressed-air jacket is supplied to the reducing agent flow in such a way that the reducing agent flow is converted preferably continuously into a mixture flow, wherein the mixture flow, during the conversion, is expanded and the compressed-air jacket is depleted, wherein the mixture flow first comes into contact with the mixing duct when the compressed-air jacket has been at least 90% depleted.

During the depletion of the compressed-air jacket, the compressed-air jacket is supplied to the reducing agent flow or to the mixture flow. The depletion of the compressed-air jacket or the supply of the compressed air to the mixture flow takes place preferably by using substantially laminar flows, or by diffusion. The presence of a laminar flow of reducing agent and compressed air may be obtained by using a suitable selection of the Reynolds number, of the reducing agent flow or of the compressed-air flow and of the mixture flow. The Reynolds number may in turn be influenced by the construction of the mixing chamber.

The fact that the reducing agent jet first comes into contact with the mixing duct and/or with the wall of the mixing duct when the compressed-air jacket has been at least 90% depleted, and therefore in particular the reducing agent flow or the mixture flow has been at least 90% mixed through with the compressed-air jacket, means that no depositions of reducing agent can form in the mixing duct or, in particular, also at the mixing point.

With the objects of the invention in view, there is concomitantly provided a motor vehicle, comprising an internal combustion engine, an exhaust-gas treatment device for the purification of the exhaust gases of the internal combustion engine, a reducing agent source, a compressed-air source and a device according to the invention for producing a mixture of reducing agent and compressed air, which mixture can be supplied to the exhaust-gas treatment device. The device in the motor vehicle is, in particular, also suitable for carrying out a method according to the invention.

Other features which are considered as characteristic for the invention are set forth in the appended claims, noting that the features specified individually in the claims may be combined with one another in any desired technologically meaningful way, and may be supplemented by explanatory facts from the description, with further structural variants of the invention being highlighted.

Although the invention is illustrated and described herein as embodied in a method and a device for mixing compressed air and reducing agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
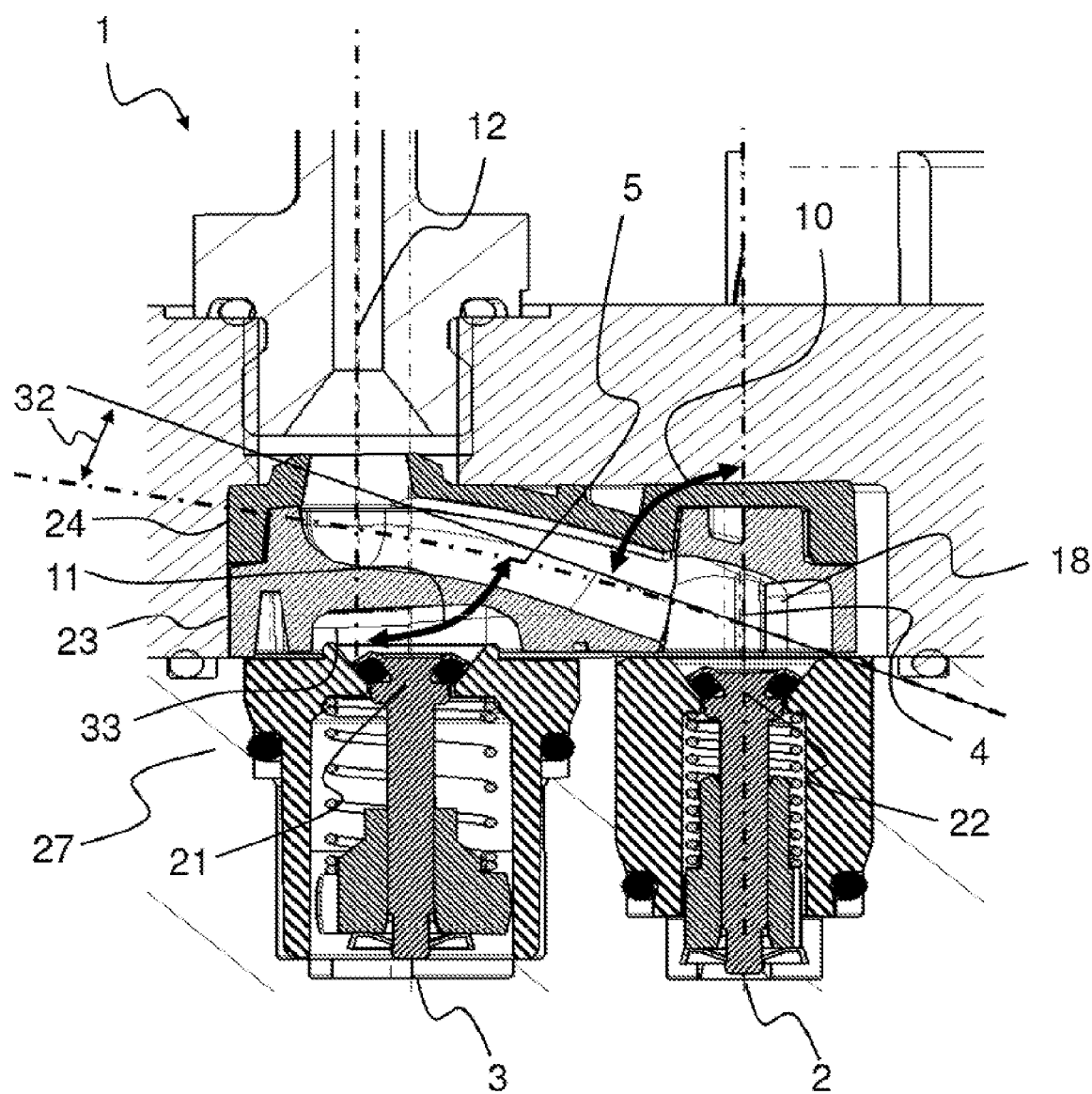
FIG. 1 is a fragmentary, diagrammatic, sectional view of a device according to the invention.

Referring now in detail to the figures of the drawings, which show particularly preferred exemplary embodiments to which the invention is not restricted and in which proportions are merely diagrammatic, and first, particularly, to FIG. 1 thereof, there is seen a section through a device 1 according to the invention. The device 1 is composed of a lower first component 23 and of an upper second component 24, which together can be mounted on a base plate 27. The base plate 27 may, for example, be a constituent part of a pump module which serves for delivering the reducing agent and/or for delivering the air. Reducing agent passes through a first inflow duct 2 into the device 1. Air passes through a second inflow duct 3 into the device 1. The supply of reducing agent can be regulated by using a first valve 22 in the first inflow duct 2. The supply of air can be regulated by using a second valve 21 in the second inflow duct 3. The first inflow duct 2 opens into a mixing point 4 in the device 1. A mixing duct 5 branches off from the mixing point 4. The mixing duct 5 is, in a sense, a continuation of the first inflow duct 2. There is a first angle 10 of 45° to 85° between the first inflow duct 2 and the mixing duct 5. The mixing duct 5 has a curvature 32. The curvature is preferably between 5° and 10° over the entire length of the mixing duct 5. The mixing duct 5 opens into an outlet duct 12. A second angle 11 is formed between the mixing duct 5 and the outlet duct 12. The second inflow duct 3 initially opens into a collecting region 33. Injection ducts (which are not illustrated in FIG. 1) branch off from the collecting region 33 and open tangentially into the mixing point 4. FIG. 1 also shows a guide structure 18 which extends into the mixing point 4.

Figure 2:
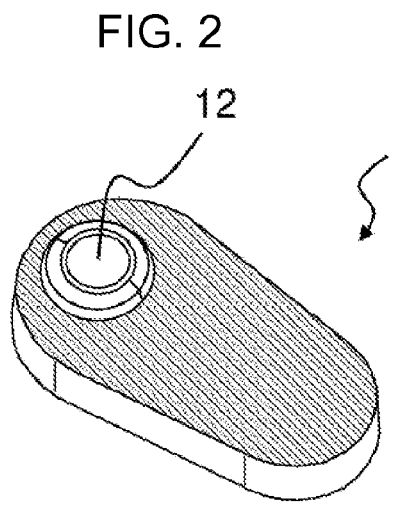
FIG. 2 is a perspective, top-plan view of a second component of a device according to the invention.
Figure 3:
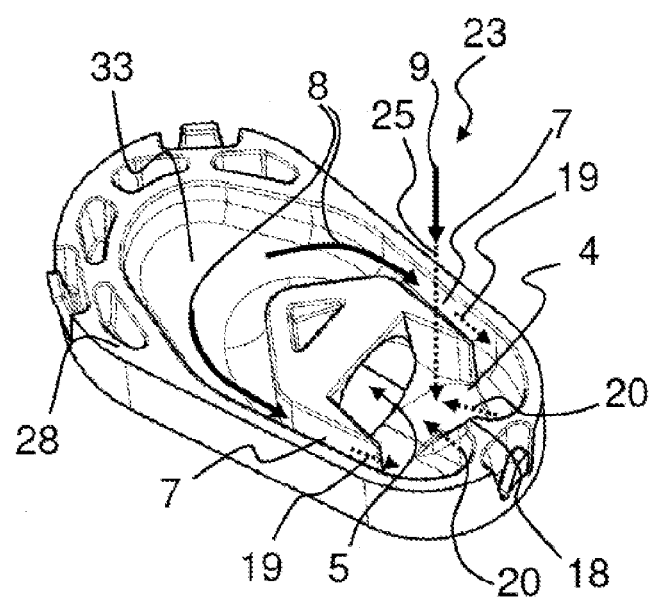
FIG. 3 is a perspective, bottom-plan view of a first component of a device according to the invention.
Figure 4:
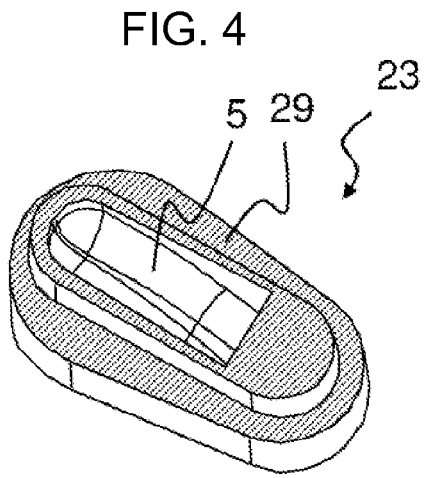
FIG. 4 is a perspective, top-plan view of a first component of a device according to the invention.
Figure 5:
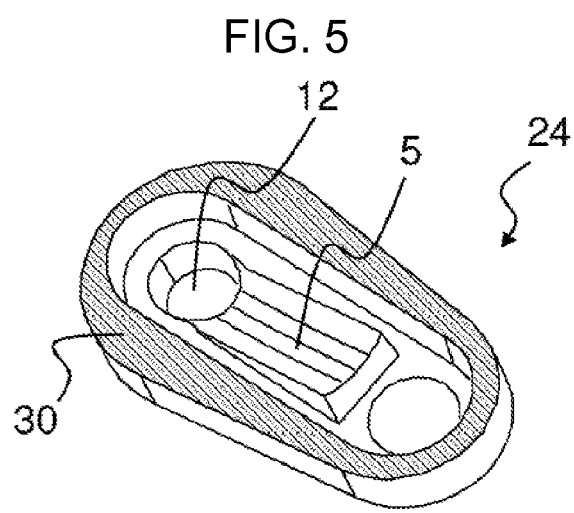
FIG. 5 is a perspective, bottom-plan view of a second component of a device according to the invention.

FIGS. 2 to 5 are used to explain the first component 23 and the second component 24 of the device according to the invention in detail, and will be described jointly herein. FIGS. 3 and 4 each show the first component 23, whereas FIGS. 2 and 5 illustrate the second component 24. In FIGS. 2 and 4, the first component 23 and the second component 24 are respectively illustrated from above. FIGS. 3 and 5 respectively show a view from below of the first component 23 and of the second component 24.

FIG. 3 shows the collecting region 33 into which the second inflow duct for compressed air opens. Also shown is the mixing point 4 into which the first inflow duct for reducing agent opens. A reducing agent flow 9, which is illustrated as an arrow, opens in an axial direction 25 into the mixing point 4. The mixing duct 5, the start of which can be seen in FIG. 3, extends in a manner proceeding from the mixing point 4. The continuation of the mixing duct 5 is shown in FIG. 4, which illustrates the first component 23 from FIG. 3 in a view from above.

The compressed air passes out of the collecting region 33 through two injection ducts 7 into the mixing point 4. In this case, the compressed air flows as a compressed-air flow 8 through the injection ducts 7 in a tangential direction 19 into the mixing point 4. The circumferential segment of the mixing point 4 is not illustrated in FIG. 3. The circumferential segment in this case is, for example, a segment of an imaginary cylinder around the mixing point 4. In the mixing point 4, the first component 23 has a guide structure 18. Through the use of the guide structure 18, the compressed-air flows 8 are deflected into a radial direction 20. In this way, the compressed-air flows 8 assist a deflection of the reducing agent flow 9 into the mixing duct 5.

The first component 23 has a planar first contact surface 28 through which it can be mounted on the base plate illustrated in FIG. 1. The base plate, which is illustrated in FIG. 1, preferably has a planar contact surface which has ports for compressed air and reducing agent. The ports form the first inflow duct and the second inflow duct or are matched to the first inflow duct and/or to the second inflow duct. The first contact surface 28 can be placed against that planar contact surface. Furthermore, the first component 23 has a second contact surface 29 illustrated in FIG. 4. The second component 24 can be mounted against the second contact surface 29 by using a third contact surface 30. The third contact surface 30 of the second component 24 is visible in FIG. 5. FIGS. 2 and 5 also show how the mixing duct 5 continues proceeding from the mixing point 4 illustrated in FIG. 3, and opens into the outlet duct 12 at which the mixture of reducing agent and air is provided.

Figure 6:
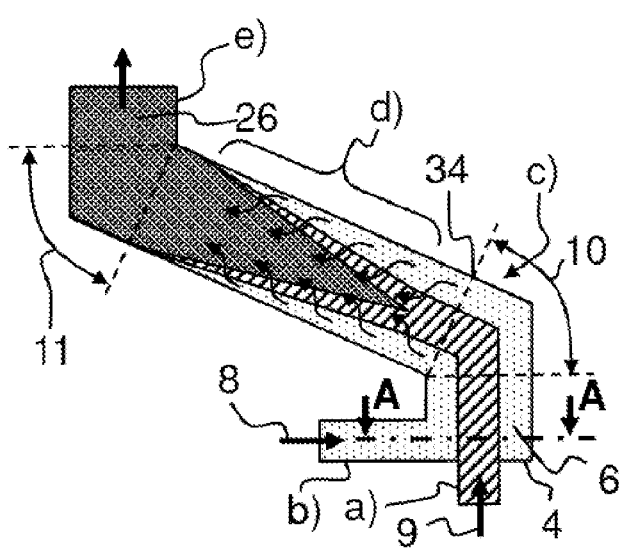
FIG. 6 is a sectional view illustrating a jacket flow.

FIG. 6 is a diagrammatic view intended to illustrate the provision of the mixture in the device according to the invention or according to the method of the invention. It is shown how a reducing agent flow 9 is generated in a method step a). It is also shown how, according to a method step b), a compressed-air jacket 6 around the reducing agent flow 9 is generated, in such a way that a jacket flow 34 is formed. For this purpose, a compressed-air flow 8 is supplied tangentially. The jacket flow 34 is supplied, in a step c), to a mixing duct 5, which is not illustrated therein. In the mixing duct 5, in a method step d), the compressed-air jacket 6 and the reducing agent flow 9 of the jacket flow 34 are mixed with one another. For this purpose, the compressed air from the compressed-air jacket 6 is supplied to the reducing agent flow 9, in such a way that the reducing agent flow 9 is converted increasingly or continuously into a mixture flow 26. This is illustrated by arrows which show how the compressed air is introduced into the reducing agent flow 9. In this case, the compressed-air jacket 6 becomes ever thinner, whereas the mixture flow 26 becomes ever thicker.

The jacket flow 34 is deflected by a first angle 10 between step b) and step c) or step d). The mixture flow 26 is deflected by a second angle 11 between step d) and step e). If appropriate, step d) may also be accompanied by a slight deflection of the flows, in which that deflection is predefined by a curvature of the mixing duct.

Figure 7:
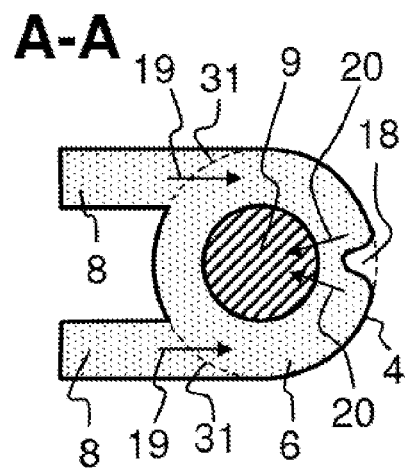
FIG. 7 is a sectional view taken along a line A-A of FIG. 6, in the direction of the arrows.

FIG. 7 shows a section A-A indicated in FIG. 6, through the mixing point 4. It is seen how the compressed-air flows 8 are supplied in a tangential direction 19 over a circumferential segment 31 of the mixing point 4. The reducing agent flow 9 disposed centrally in the mixing point 4 is also shown. The compressed-air flows are deflected by a guide structure 18 into a radial direction 20 with respect to the reducing agent flow 9. The compressed air forms the compressed-air jacket 6 around the reducing agent flow 9.

Figure 8:
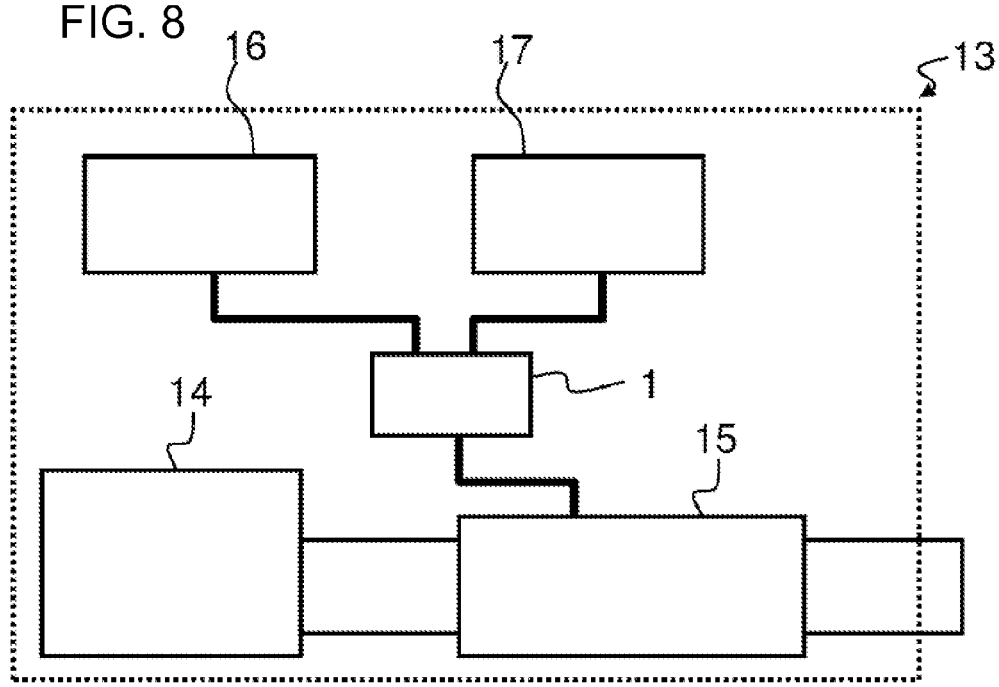
FIG. 8 is a block diagram of a motor vehicle having a device according to the invention.

FIG. 8 shows a motor vehicle 13 having an internal combustion engine 14 and an exhaust-gas treatment device 15 for the purification of the exhaust gases of the internal combustion engine. The motor vehicle 13 also has a reducing agent source 16 and a compressed-air source 17. The compressed air from the compressed-air source 17 and the reducing agent from the reducing agent source 16 are mixed in a device 1 according to the invention and supplied to the exhaust-gas treatment device 15. The reducing agent source 16 may, for example, be a tank and a delivery device for reducing agent. The compressed-air source 17 may be realized, for example, by using a compressed-air source provided specifically for the purpose of providing reducing agent, such as a small compressor. It is alternatively also possible, for example, for compressed air generated by a turbocharger of the internal combustion engine 14 to be used as a compressed-air source 17. Compressed air in the brake system of the motor vehicle 13 may also be used as a compressed-air source 17.

The invention claimed is:

1. A device for providing a mixture of compressed air and liquid reducing agent, the device comprising:
   a first inflow duct for reducing agent;
   a second inflow duct for compressed air;
   an outlet duct for the mixture of compressed air and liquid reducing agent;
   a mixing point at which the compressed air and the reducing agent are merged;
   a mixing duct adjoining said mixing point and connecting said mixing point and said outlet duct;
   said first inflow duct opening into said mixing point in an axial direction;
   at least two injection ducts connecting said second inflow duct to said mixing point, said at least two injection ducts opening into said mixing point in a tangential direction in a circumferential segment; and
   a guide structure disposed between said at least two injection ducts, said guide structure being configured to deflect compressed-air flows entering into said mixing point through said injection ducts into a radial direction relative to a reducing agent flow.

2. The device according to claim 1, wherein said mixing point is configured to receive the compressed air forming a compressed-air jacket around the reducing agent in vicinity of said mixing point.

3. The device according to claim 1, wherein said outlet duct is aligned parallel to said first inflow duct.

4. The device according to claim 1, wherein said first inflow duct and said second inflow duct are disposed parallel to one another.

5. The device according to claim 1, wherein said mixing point and said mixing duct are formed of polymer material.

6. A motor vehicle, comprising:
   an internal combustion engine;
   an exhaust-gas treatment device for purification of exhaust gases of said internal combustion engine;

a reducing agent source;

a compressed-air source; and a device according to claim 1 configured to produce a mixture of reducing agent from said reducing agent source and compressed air from said compressed-air source and to supply said mixture to said exhaust-gas treatment device.

7. The device according to claim 1, wherein an average pressure of the reducing agent in said first inflow duct is between 3.0 and 3.5 bar and an average pressure of the compressed air in said second inflow duct is between 3.5 and 4.0 bar.

8. The device according to claim 1, wherein said at least two injection ducts have a total cross-sectional area smaller than a cross-sectional area of said second inflow duct.

9. The device according to claim 1, wherein said mixing duct merges continuously from a circular cross-sectional shape directly downstream of said mixing point into a flattened shape upstream of said outlet duct.

10. The device according to claim 1, wherein said mixing duct is disposed at a first angle of 45° to 85° relative to said axial direction of said first inflow duct.

11. The device according to claim 10, wherein said mixing duct has a profile being curved away from said outlet duct, and said outlet duct and said mixing duct form a second angle of 50° to 90° therebetween.

12. A method for mixing liquid reducing agent and compressed air to form a mixture, the method comprising the following steps:

a) generating a reducing agent flow;
b) generating a compressed-air jacket around the reducing agent flow forming a jacket flow by conducting the compressed air jacket tangentially through at least two injection ducts in a circumferential segment to a mixing point and deflecting the compressed air jacket entering the mixing point into a radial direction relative to the reducing agent flow by using a guide structure between the at least two injection ducts;
c) introducing the jacket flow into a mixing duct;
d) mixing the compressed-air jacket and the reducing agent flow in the mixing duct forming a mixture flow; and
e) providing the mixture flow at an outlet duct.

13. The method according to claim 12, which further comprises deflecting the jacket flow, before step c), about a first angle of 45° to 85°.

14. The method according to claim 12, which further comprises:
- in step d), supplying the compressed-air jacket to the reducing agent flow while converting the reducing agent flow into the mixture flow;
- during the converting step, expanding the mixture flow and depleting the compressed-air jacket; and
- initially bringing the mixture flow into contact with the mixing duct when the compressed-air jacket has been at least 90 percent depleted.

15. The method according to claim 12, wherein the mixing of the compressed-air jacket and the reducing agent flow in step d) is a laminar mixing or a mixing carried out by diffusion.

* * * * *